United States Patent [19]

Masso et al.

[11] Patent Number: 4,632,527
[45] Date of Patent: Dec. 30, 1986

[54] ANTI-STATIC OPHTHALMIC LENSES

[75] Inventors: Jon D. Masso, Whitinsville; Donald D. Carmelite, Shrewsbury, both of Mass.

[73] Assignee: American Optical Corporation, Southbridge, Mass.

[21] Appl. No.: 500,997

[22] Filed: Jun. 3, 1983

[51] Int. Cl.⁴ .................. G02C 7/02; B05D 5/12; B32B 3/00
[52] U.S. Cl. .................. 351/166; 351/177; 427/164; 428/922
[58] Field of Search .................. 428/922; 427/164; 351/166, 159, 177; 350/642

[56] References Cited

U.S. PATENT DOCUMENTS

| | | |
|---|---|---|
| 2,864,928 | 12/1958 | Danford .................. 219/19 |
| 3,389,012 | 6/1968 | Hamm . |
| 3,471,316 | 10/1969 | Manuel . |
| 3,475,307 | 10/1969 | Knox et al. . |
| 3,526,583 | 9/1970 | Hayward . |
| 3,600,122 | 8/1971 | Coleman . |
| 3,687,832 | 8/1972 | Fydelor et al. . |
| 3,801,418 | 4/1974 | Cornelis et al. .................. 427/164 |
| 3,953,115 | 4/1976 | French et al. .................. 427/164 |
| 3,986,997 | 10/1976 | Clark . |
| 4,052,520 | 10/1977 | Chang et al. . |
| 4,140,607 | 2/1979 | Kreiselmeier et al. . |
| 4,160,584 | 7/1979 | Giles .................. 351/49 |
| 4,168,113 | 9/1979 | Chang et al. . |
| 4,172,156 | 10/1979 | Ritter et al. . |
| 4,188,451 | 2/1980 | Humphrey, Jr. .................. 427/164 |
| 4,211,823 | 7/1980 | Suzuki et al. . |
| 4,276,138 | 6/1981 | Asai et al. . |
| 4,308,317 | 12/1981 | Olson et al. . |
| 4,371,585 | 2/1983 | Memon .................. 427/164 |
| 4,410,567 | 10/1983 | France et al. . |
| 4,478,873 | 10/1984 | Masso et al. .................. 427/164 |

FOREIGN PATENT DOCUMENTS

| | | |
|---|---|---|
| 2147558 | 9/1971 | Fed. Rep. of Germany . |
| 2005224 | 12/1969 | France . |
| 2349429 | 4/1977 | France . |
| 854358 | 11/1960 | United Kingdom . |
| 1205271 | 9/1970 | United Kingdom . |
| 1501243 | 9/1974 | United Kingdom . |
| 1518580 | 7/1978 | United Kingdom . |
| 2112301 | 7/1983 | United Kingdom . |

OTHER PUBLICATIONS

E. Merck, Darmstadt, Oct. 1, 1978, Bundesrepublik Deutschland.

Primary Examiner—John K. Corbin
Assistant Examiner—Scott J. Sugarman
Attorney, Agent, or Firm—Pahl, Lorusso & Loud

[57] ABSTRACT

Organic polymeric plastic substrates of optical elements are made anti-static and abrasion-resistant by: applying a conductive layer to at least one surface of the plastic substrate; and overcoating the conductive layer with an abrasion-resistant layer.

54 Claims, 3 Drawing Figures

ANTI-STATIC OPHTHALMIC LENSES

BACKGROUND OF THE INVENTION

This invention relates to a novel anti-static, abrasion-resistant optical element, particularly a plastic ophthalmic lens having a conductive layer deposited on at least one surface and an abrasion-resistant coating adhered thereto and to novel and improved methods of making such optical elements.

The term static electricity denotes the group of phenomena associated with the accumulation of electrical charges. Attraction of small particles by an electrically charged body is due to the induced charge. By approaching another insulator (dirt, ash, etc.) the negatively charged body repels the electrons at the surface of the particles. Thus their surface becomes positively charged and attraction results. After contact is established, the charge in the small particle is gradually neutralized; eventually the particle attains a negative charge and is repelled.

The build-up of static charge on plastic elements (especially plastic ophthalmic lenses coated with abrasion-resistant coatings) attracts dust and is unacceptable in many applications (e.g., polycarbonate safety lenses in steel mills, cotton mills and coal mines). In the case of eyewear, these dust particles cause light scattering or haze which can severely limit the visual acuity of the wearer and necessitates frequent cleaning.

Certain topical treatments are commercially available for the prevention of static charge build-up, but these topical treatments are short lived and must be continually repeated.

Another way of preventing the build-up of static charge on plastic lenses is to imbibe anti-static agents into the plastic materials. However, these anti-static agents are known eye irritants and may not be suitable for ophthalmic purposes. Furthermore, these anti-static agents are designed to migrate to the surface where they can interfere with the coating/substrate interface.

Accordingly, it is the principal object of the present invention to prevent the build-up of static charge on optical elements.

It is a further object of the present invention to prevent the build-up of static charge on plastic ophthalmic lenses coated with abrasion-resistant coatings.

It is still a further object of the present invention to produce an anti-static abrasion-resistant optical element that is neither moisture or wear sensitive.

SUMMARY OF THE INVENTION

The problems of the prior art are overcome by the discovery that novel anti-static, abrasion-resistant optical elements that are neither moisture or wear sensitive can be produced by applying a conductive layer to at least one surface of an organic polymeric plastic substrate and overcoating said conductive layer with a protective layer.

If a semi-transparent conductive material known in the industry such as indium doped tin oxide ($InSnO_2$) is used for the conductive layer, then after the conductive layer is deposited on at least one surface of the plastic substrate, the plastic substrate is preferably subjected to a glow discharge treatment before the abrasion-resistant coating is applied in order to convert the conductive layer to a fully transparent state. Optionally, if such a transparent conductive layer is used, a silicon oxide ($SiO_x$ wherein x ranges from 1 to <2) prime coat may be applied to the surface of the plastic substrate before the conductive layer is applied, and another optional silicon oxide prime coat may be applied after the optional glow discharge process and before the application of the abrasion-resistant coating.

DESCRIPTION OF THE PREFERRED EMBODIMENT

The anti-static abrasion-resistant optical element of the present invention comprises: an organic polymeric plastic substrate; a conductive layer deposited on at least one surface of said plastic substrate; and a protective layer overcoating said conductive layer.

Any type of organic polymeric plastic substrate may be used, i.e., a polycarbonate substrate, more specifically a poly(2,2'-dihydroxyphenylpropane)carbonate substrate; an allyl substrate, more specifically a CR-39 TM substrate; or an acrylic substrate, more specifically a polymethyl methacrylate substrate. CR-39 TM is a polydiethylene glycol bis(allyl carbonate) obtained from PPG Industries, Inc. If the optical element of the invention is to be used for ophthalmic purposes, then the plastic substrate must be transparent.

The conductive layer may comprise any metal or semiconductor. The type of material used for the conductive layer is dependent upon what type of optical element is being produced. For instance, gold would be a good candidate in many applications. Gold gives a pleasing light greenish transmitted light and reflects infrared, therefore it is a good choice to be used in architectual glass or heat control. Gold, however, is expensive and does not generally adhere well. For ophthalmic use, factors such as maximizing the transmittance and achieving good adherence to the lens and overcoating are essential. Chromium is a good candidate for ophthalmic applications because of its good adherence. Other similar metals would be nickel, nichrome (a nickel chromium alloy), and palladium.

If metal is used for the conductive layer of an ophthalmic element, the metal layer must be as thin as possible in order to maximize the transmittance, however, the metal layer must still be thick enough to form a continuous or quasi continuous film in order to be conductive. For chromium, this optimum thickness was found to be about 30 A (Angstroms)±5 A. When the thickness of the chromium layer is around 30 A, the coating becomes conducting while the transmission for visible light of the coated lens meets or comes very close to meeting the 89% ANSI requirement for plano safety lenses. If the percent transmission for visible light of a coated plano safety lens of this invention is at least 85%, it is believed that the advantages of such a lens, i.e. the antistatic properties outweigh the reduced transmittance. Thicker anti-static metal coatings with percent transmissions for visible light of at least 60% are quite useful for other eyewear and optical applications.

The conductive layer may be applied to at least one surface of the plastic substrate by any conventional means known in the art for producing a conductive layer of controlled thickness, such as by vacuum deposition or sputtering.

Figure 1:
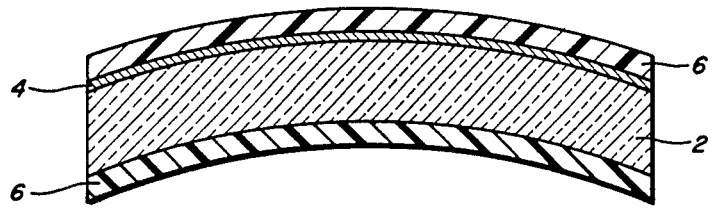
FIG. 1 is a side view of a lens manufactured in accordance with the present invention.

FIG. 1 shows an ophthalmic lens 2 in which a layer of chromium metal 4 was deposited onto the front (convex) surface. The lens was then overcoated with an abrasion-resistant coating 6.

Even though the conductive metal layer is overcoated by a dielectric coating, the conductivity through the dielectric coating and along the metal coating is sufficient to cause a static charge applied to the surface to dissipate at a significantly faster rate than a similarly coated lens without the underlying metal film.

Table 1 describes the properties of an ophthalmic lens made in accordance with this invention having a poly(2,2'-dihydroxyphenylpropane)carbonate substrate, a chromium metal conductive layer and an organo-silica layer (made in accordance with U.S. Pat. No. 4,211,823, Suzuki et al, the teachings of which are incorporated herewith).

TABLE 1

| | Chromium Metal Coating |
|---|---|
| Visual Transmittance | 76.6% |
| Charge Decay Time | 3.6 sec. |
| Material of Conductive Layer | Cr. Metal |
| Coating Thickness | 35 A |

The charge decay time of 3.6 seconds may be compared with times of tens or hundreds of minutes for polymer ophthalmic lenses or organo-silica coated polymer lenses under the same conditions but without the presence of the conductive layer.

Since a thin metal thickness is difficult to control accurately, a semi-transparent semiconductor which can be made transparent such as indium doped tin oxide or zinc oxide is the preferred material for the conductive layer of an ophthalmic element. A suitable form of indium doped tin oxide to be used is Patinal® Substance A from E. M. Laboratories, Inc.

If such a semi-transparent conductive material known in the industry such as indium doped tin oxide is used for the conductive layer, then after the conductive layer is applied to at least one surface of the plastic substrate by vacuum deposition, sputtering or any method known in the art for producing a conductive layer of controlled thickness, the plastic substrate is preferably subjected to a glow discharge treatment before the abrasion-resistant coating is applied. The purpose of the glow discharge treatment is to fully convert the semiconductor to the transparent state. Although the glow discharge treatment can take place under any conditions of pressure, voltage and current which will sustain a glow discharge, the semiconductor is preferably subjected to a glow discharge treatment of from 1-10 minutes, preferably 1-5 minutes, in an oxygen atmosphere under a pressure of between 0.05 and 0.150 Torr, at a voltage of 100 to 1500 VDC (Volts Direct Current) and an amperage of 100 to 800 mA.

The thickness of the semiconductor layer is not critical. For instance, it was found that an indium doped tin oxide layer thickness of 100 Angstroms was adequate. An indium doped tin oxide thickness of 100 A was found to be easily converted to a transparent state in a glow discharge of 1-5 minutes. This 100 Angstrom thickness gave sufficiently good conductivity with minimal optical absorbance. The only constraint on the thickness of the semiconductor coating is that a thicker coating becomes more difficult to fully convert to the transparent state. For example, using the glow discharge method to convert the indium doped tin oxide, if the thickness is greater than 150 A, it may be necessary to deposit the coating in 100 A increments followed by a glow discharge treatment after each increment to build up to the total thickness.

If a semi-transparent conductive material which can be made transparent such as indium doped tin oxide is used for the conductive layer, a silicon oxide (defined for purposes of this invention as $SiO_x$ wherein x ranges from 1 to <2) prime coat is preferably applied to the surface of the plastic substrate that the conductive layer will be applied to before the conductive layer is applied, and another silicon oxide prime coat is preferably applied on top of the conductive layer after the optional glow discharge process and before the application of the abrasion-resistant coating. The silicon oxide prime coat layers are used simply to promote adhesion of the transparent conductive layer, i.e., indium doped tin oxide, to the plastic substrate and to the abrasion-resistant overcoating.

Table 2 gives standard durability test data results for ophthalmic lenses having poly(2,2'-dihydroxyphenylpropane)carbonate substrates, indium doped tin oxide conductive layers (fully converted to their transparent state through the use of a glow discharge treatment) and Suzuki et al overcoatings (Configuration 1), and ophthalmic lenses having all the same components plus a silicon oxide layer applied to the polycarbonate substrate and a silicon oxide layer applied to the fully converted indium doped tin oxide layer (Configuration 2).

TABLE 2

| DURABILITY TEST DATA COMPARISON | |
|---|---|
| Configuration 1: Poly (2,2'-dihydroxyphenylpropane) carbonate/$InSnO_2$/Suzuki et al | |
| Tape Test | Failed |
| Life Test (Acidic Salt Solution Soak | Failed |
| Configuration 2: Poly (2,2'-dihydroxyphenylpropane) carbonate/$SiO_x$/$InSnO_2$/$SiO_x$/Suzuki et al | |
| Tape Test | Passed |
| Cycle Humidity Plus Tape Test | Passed |
| Boiling Water Plus Tape Test | Passed |
| Pad Abrasion Plus Tape Test | Passed |
| Life Test | Passed |
| Life Test Plus Tape Test | Few Small Tape Pulls |

Table 3 describes the properties of an ophthalmic lens made in accordance with this invention having a poly(2,2'-dihydroxyphenylpropane)carbonate substrate, a silicon oxide coating, a indium doped tin oxide conductive layer (fully converted to its transparent state through the use of a glow discharge treatment), another silicon oxide coating, and finally a Suzuki et al overcoating.

TABLE 3

| | $InSnO_2$ Metal Oxide Coating |
|---|---|
| Visual Transmittance | 88.5% |
| Charge Decay Time | <3 sec |
| Material of conductive layer | $InSnO_2$ |
| Coating Thickness | 100 A |

The charge decay time of less than 3 seconds may be compared with times of tens or hundreds of minutes for polymer ophthalmic lenses or organo-silica coated polymer lenses under the same conditions but without the presence of the conductive layer.

The abrasion-resistant layer of the optical element of the invention may comprise an organic layer, ie. melamine formaldehyde; an organo-silica layer, i.e. polyorgano siloxane or silica-polyorgano siloxane; or an inorganic layer, i.e. glass or $SiO_2$.

If an organo-silica layer is used, the thickness of the organo-silica layer is preferably between 1.5 and 7 microns. The silica-polyorgano siloxane coatings disclosed in U.S. Pat. No. 4,211,823 (Suzuki et al) and U.S. Pat. No. 3,986,997 (Clark), the disclosures of which are incorporated herein, are the preferred organo-silica coatings of the invention.

The Suzuki et al coating composition includes (A)(1) hydrolysates of silane compounds containing at least one epoxy group and not less than two alkoxy groups which are directly bonded to Si atom in the molecule, and if necessary, (2) compounds containing silanol and/or siloxane groups in the molecule, and/or epoxy compounds; (B) fine silica particles having an average diameter of from about 1 to about 100 mu; and (C) an aluminum chelate compound having the general formula $AlX_nY_{3-n}$, where X is OL (and L represents a lower alkyl group), Y represents one or more ligands produced from a compound selected from the group consisting of $M^1COCH_2COM^2$ and $M^3COCH_2COOM^4$ where all of $M^1$, $M^2$, $M^3$ and $M^4$ are lower alkyl groups, and wherein n is an integer comprising 0, 1 or 2; and (D) a solvent comprising more than about 1 weight percent water, the amount of Component B being about 1 to 500 parts by weight per 100 parts by weight of Component A, and the amount of Component C being about 0.01 to 50 parts by weight per 100 parts by weight of Component A.

The Clark coating composition is an aqueous coating composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

The invention is better illustrated by the following nonlimiting examples.

EXAMPLE 1

A typical process for producing an ophthalmic lens in accordance with the present invention comprises the following steps:

1. Vacuum coat side 1 of a plastic substrate with 100 A silicon monoxide.
2. Flip the plastic substrate to the other side and vacuum coat side 2 with 100 A silicon monoxide.
3. Vacuum coat side 2 with 100 A of indium doped tin oxide (e.g. "Substance A" from E. M. Laboratories, Inc.).
4. Flip and vacuum coat side 1 with 100 A of indium doped tin oxide.
5. Glow discharge side 1 in oxygen at 0.070 Torr, 300 mA, $350 \pm 50$ VDC, for 1-5 minutes.
6. Flip and glow discharge side 2 as in step 5.
7. Vacuum coat side 2 with 100 A silicon monoxide.
8. Flip and vacuum coat side 1 with 100 A silicon monoxide.
9. Remove from vacuum coater and apply an organo-silica overcoating by any of the standard techniques such as dipping or spinning.

EXAMPLE 2

Figure 2:
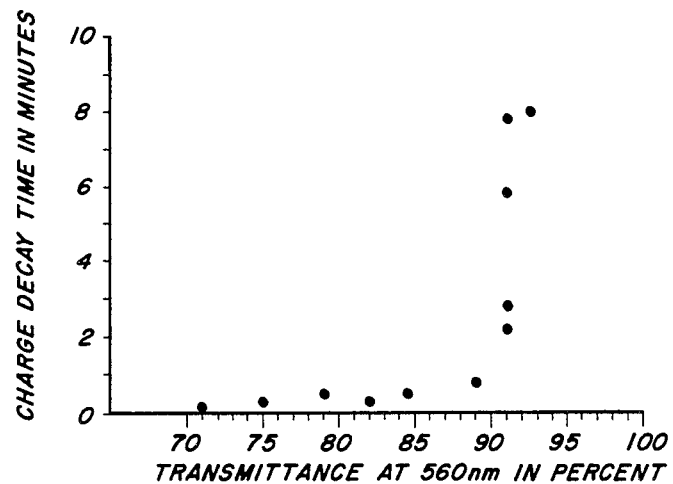
FIG. 2 is a graph showing charge decay time versus transmittance for a lens manufactured in accordance with the present invention.
Figure 3:
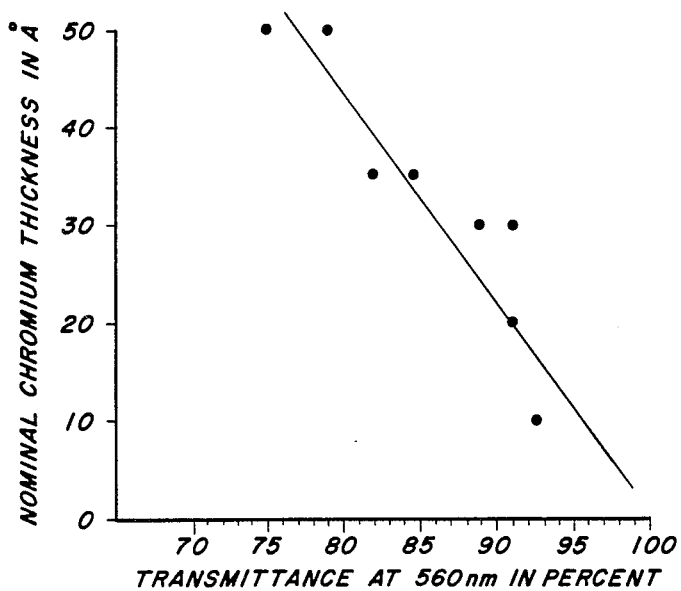
FIG. 3 is a graph showing nominal chromium thickness versus transmittance for a lens manufactured in accordance with the present invention.

Ophthalmic lenses comprising poly(2,2'-dihydroxyphenylpropane)carbonate substrates, vacuum deposited chromium metal layers on the plastic substrates and overcoatings of standard Suzuki et al material were produced. Tests were run in order to show the effect of transmittance on anti-static behavior. FIG. 2 is a graph showing the charge decay time versus transmittance. FIG. 3 is a graph showing transmittance versus nominal chromium thickness.

It can be seen from FIG. 2 that for percent transmittances from about 70 to about 89%, the charge decay time is approximately the same low amount, but for percent transmittances above 89%, there is a large increase in decay time. This increase in decay time is due to the fact that the chromium layer has beome too thin to form a continuous film and has therefore become less conductive. FIG. 3 shows that there is a fairly close correlation between nominal chromium thickness and percentage transmittance—as the chromium layer gets thinner, the percent transmittance increases.

Although this invention has been described with reference to its preferred embodiment, other embodiments can achieve the same result. Variations and modifications of the present invention will be obvious to those skilled in the art and it is intended to cover in the appended claims all such modifications and equivalents as follow in the true spirit and scope of this invention.

We claim:

1. An anti-static abrasion-resistant optical element having a percent transmittance for visible light of at least 60% comprising:
   (a) an organic polymeric plastic substrate;
   (b) a conductive metal layer comprising chromium having a thickness of between 25 and 35 Angstroms applied to at least one surface of said plastic substrate; and
   (c) an abrasion-resistance silica-polyorgano siloxane layer overcoating said conductive layer.

2. The optical element of claim 1 wherein the plastic substrate comprises polycarbonate.

3. The optical element of claim 2 wherein the plastic substrate comprises poly(2,2'-dihydroxyphenylpropane)carbonate.

4. The optical element of claim 1 wherein the plastic substrate comprises polydiethylene glycol bis(allyl carbonate).

5. The optical element of claim 1 wherein the plastic substrate comprise polymethyl methacrylate.

6. The optical element of claim 1 wherein the optical element is an ophthalmic lens.

7. The optical element of claim 1 wherein the silica-polyorgano siloxane layer comprises components A, B, C, and D wherein:
   Component A is:
   a hydrolysate of a silane compound containing an epoxy group and not less than two alkoxy groups which are directly bonded to an Si atom in the molecule;

Component B comprises fine particles of silica which particles have an average diameter of about 1 to 100 mu;

Component C comprises an aluminum chelate compound having the formula $AlX_nY_{3-n}$ wherein X is OL (wherein L is a lower alkyl group), Y is at least one ligand produced from the group consisting of: (1) $M^1COCH_2COM^2$ and (2) $M^3COCH_2COOM^4$ wherein ($M^1$, $M^2$, $M^3$ and $M^4$ are lower alkyl groups) and n is 0, 1 or 2, and wherein Component D comprises a solvent comprising more than about 1 weight percent water, the amount of Component B being about 1 to 500 parts by weight per 100 parts by weight of Component A, and the amount of Component C being about 0.01 to 50 parts by weight per 100 parts by weight of Component A.

8. The optical element of claim 1 wherein said silica-polyorgano siloxane layer comprises an aqueous coating composition comprising a dispersion of colloidal silica in lower aliphatic alcohol-water solution, wherein said solution is the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent of the partial condensate, said composition containing sufficient acid to provide a pH in the range of 3.0 to 6.0.

9. An anti-static abrasion-resistant optical element having a percent transmittance for visible light of at least 60% comprising:
(a) an organic polymeric plastic substrate;
(b) a conductive metal layer comprising chromium having a thickness of between 25 and 35 Angstroms applied to at least one surface of said plastic substrate; and
(c) an abrasion-resistant glass layer overcoating said conductive layer.

10. The optical element of claim 9 wherein the optical element is an ophthalmic lens.

11. An anti-static abrasion-resistant optical element comprising:
(a) an organic polymeric plastic substrate;
(b) a transparent conductive semiconductor layer comprising indium doped tin oxide affixed to at least one surface of said plastic substrate; and
(c) an abrasion-resistant layer overcoating said semiconductor layer.

12. The optical element of claim 11 wherein the plastic substrate comprises polycarbonate.

13. The optical element of claim 12 wherein the plastic substrate comprises poly(2,2'-dihydroxyphenylpropane)carbonate.

14. The optical element of claim 11 wherein the plastic substrate comprises polydiethylene glycol bis(allyl carbonate).

15. The optical element of claim 11 wherein the plastic substrate comprise polymethyl methacrylate.

16. The optical element of claim 11 wherein there is a coating of silicon oxide between said plastic substrate and said indium doped tin oxide layer.

17. The optical element of claim 11 wherein there is a coating of silicon oxide between said indium doped tin oxide layer and said abrasion-resistant layer.

18. The optical element of claim 16 wherein there is a coating of silicon oxide between said indium doped tin oxide layer and said abrasion-resistant layer.

19. The optical element of claim 11 wherein the abrasion-resistant layer comprises silica-polyorgano siloxane.

20. The optical element of claim 19 wherein the silica-polyorgano siloxane layer comprises components A, B, C, and D wherein:
Component A is:
a hydrolysate of a silane compound containing an epoxy group and not less than two alkoxy groups which are directly bonded to an Si atom in the molecule;
Component B comprises fine particles of silica which particles have an average diameter of about 1 to 100 mu;
Component C comprises an aluminum chelate compound having the formula $AlX_nY_{3-n}$ wherein X is OL (wherein L is a lower alkyl group), Y is at least one ligand produced from the group consisting of: (1) $M^1COCH_2COM^2$ and (2) $M^3COCH_2COOM^4$ wherein ($M^1$, $M^2$, $M^3$ and $M^4$ are lower alkyl groups) and n is 0, 1 or 2, and wherein
Component D comprises a solvent comprising more than about 1 weight percent water, the amount of Component B being about 1 to 500 parts by weight per 100 parts by weight of Component A, and the amount of Component C being about 0.01 to 50 parts by weight per 100 parts by weight of Component A.

21. The optical element of claim 19 where said silica-polyorgano siloxane layer comprises an aqueous coating composition comprising a dispersion of colloidal silica in lower aliphatic alcohol-water solution, wherein said solution is the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percet solids consisting essentially of 10 to 70 weight percent colloidal silica and 30 to 90 weight percent of the partial condensate, said composition containing sufficient acid to provide a pH in the range of 3.0 to 6.0.

22. The optical element of claim 11 wherein the abrasion-resistant layer comprises an inorganic layer.

23. The optical element of claim 22 wherein the inorganic layer comprises glass.

24. The optical element of claim 22 wherein the inorganic layer comprises $SiO_2$.

25. The optical element of claim 11 wherein the optical element is an ophthalmic lens.

26. The optical element of claim 18 wherein the optical element is an ophthalmic lens.

27. The optical element of claim 19 wherein the optical element is an ophthalmic lens.

28. A method for producing an anti-static abrasion-resistant optical element having a percent transmittance for visible light of at least 60% comprising the following steps:
a. applying a conductive metal layer comprising chromium having a thickness between 25 and 35 Angstroms to at least one surface of an organic polymeric plastic substrate; and b. overcoating the conductive metal layer with an abrasion-resistant layer.

29. The method of claim 28 wherein the organo-silica layer comprises silica-polyorgano siloxane.

30. The method of claim 29 wherein the silica-polyorgano siloxane layer comprises components A, B, C and D wherein:

Component A is:
a hydrolysate of a silane compound containing an epoxy group and not less than two alkoxy groups which are directly bonded to an Si atom in the molecule;

Component B comprises fine particles of silica which particles have an average diameter of about 1 to 100 mu;

Component C comprises an aluminum chelate compound having the formula $AlX_nY_{3-n}$ wherein X is OL (wherein L is a lower alkyl group), Y is at least one ligand produced from the group consisting of: (1) $M^1COCH_2COM^2$ and (2) $M^3COCH_2COOM^4$ wherein ($M^1$, $M^2$, $M^3$ and $M^4$ are lower alkyl groups) and n is 0, 1 or 2, and wherein Component D comprises a solvent comprising more than about 1 weight percent water, the amount of Component B being about 1 to 500 parts by weight per 100 parts by weight of Component A, and the amount of Component C being about 0.01 to 50 parts by weight per 100 parts by weight of Component A.

31. The method of claim 29 wherein said silica polyorgans siloxane layer comprises an aqueous coating composition comprising a dispersion of colloidal silica in lower aliphatic alcohol-water solution, wherein said solution is the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

32. The method of claim 28 wherein the abrasion-resistant layer comprises an inorganic layer.

33. The method of claim 32 wherein the inorganic layer comprises glass.

34. The method of claim 32 wherein the inorganic layer comprises $SiO_2$.

35. The method of claim 28 wherein the plastic substrate comprises poly(2,2'-dihydroxyphenylpropane)-carbonate.

36. The method of claim 28 wherein the plastic substrate comprises polydiethylene glycol bis(allyl carbonate).

37. The method of claim 28 wherein the plastic substrate comprises polymethyl methacrylate.

38. The method of claim 28 wherein the optical element comprises an ophthalmic lens.

39. A method for producing an anti-static abrasion-resistant optical element comprising the following steps:
a. applying a conductive semi-transparent semiconductor layer comprising indium doped tin oxide to at least one surface of an organic polymeric plastic substrate; and b. overcoating the conductive semiconductor layer with an abrasion-resistant layer.

40. The method of claim 39 wherein the plastic substrate comprises poly(2,2'-dihydroxyphenylpropane)-carbonate.

41. The method of claim 39 wherein the plastic substrate comprises polydiethylene glycol bis(allyl carbonate).

42. The method of claim 39 wherein the plastic substrate comprises polymethyl methacrylate.

43. The method of claim 39 wherein before the indium doped tin oxide layer is overcoated with an abrasion-resistant layer in step b, the indium doped tin oxide layer is subjected to a glow discharge treatment for a sufficient amount of time to fully convert the indium doped tin oxide to a transparent state.

44. The method of claim 43 wherein the indium doped tin oxide layer is subjected to a glow discharge treatment of from 1-10 minutes, in an oxygen atmosphere under a pressure of between 0.05 and 0.15 Torr, at a voltage of 100 to 1500 VDC and an amperage of 100 to 800 mA.

45. The method of claim 43 wherein before the indium doped tin oxide layer is applied to at least one surface of the plastic substrate in step a, the surface of the plastic substrate is coated with silicon oxide.

46. The method of claim 43 wherein before the transparent indium doped tin oxide layer is overcoated with an abrasion-resistant layer in step b, the indium doped tin oxide layer is coated with silicon oxide.

47. The method of claim 45 wherein before the transparent indium doped tin oxide layer is overcoated with an abrasion-resistant layer in step b, the indium doped tin oxide layer is coated with silicon oxide.

48. The method of claim 39 wherein the optical element comprises an ophthalmic lens.

49. The method of claim 39 wherein the abrasion-resistant layer comprises silica-polyorgano siloxane.

50. The method of claim 49 wherein the silica-polyorgano siloxane layer comprises components A, B, C and D wherein:

Component A is:
a hydrolysate of a silane compound containing an epoxy group and not less than two alkoxy groups which are dfrectly bonded to an Si atom in the molecule;

Component B comprises fine particles of silica which particles have an average diameter of about 1 to 100 mu;

Component C comprises an aluminum chelate compound having the formula $AlX_nY_{3-n}$ wherein X is OL (wherein L is a lower alkyl group), Y is at least one ligand produced from the group consisting of: (1) $M^1COCH_2COM^2$ and (2) $M^3COCH_2COOM^4$ wherein ($M^1$, $M^2$, $M^3$ and $M^4$ are lower alkyl groups) and n is 0, 1 or 2, and wherein Component D comprises a solvent comprising more than about 1 weight percent water, the amount of Component B being about 1 to 500 parts by weight per 100 parts by weight of Component A, and the amount of Component C being about 0.01 to 50 parts by weight per 100 parts by weight of Component A.

51. The method of claim 49 wherein said silica-polyorgano siloxane layer comprises an aqueous coating composition comprising a dispersion of colloidal silica in lower aliphatic alcohol-water solution, wherein said solution is the partial condensate of a silanol of the formula RSi(OH)$_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being CH$_3$Si(OH)$_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

52. The method of claim 39 wherein the abrasion-resistant layer comprises an inorganic layer.

53. The method of claim 52 wherein the inorganic layer comprises glass.

54. The method of claim 52 wherein the inorganic layer comprises SiO$_2$.

* * * * *